United States Patent
Biyani et al.

(10) Patent No.: US 9,611,756 B2
(45) Date of Patent: Apr. 4, 2017

(54) SYSTEM AND METHOD FOR PROTECTING COMPONENTS IN A GAS TURBINE ENGINE WITH EXHAUST GAS RECIRCULATION

(71) Applicants: General Electric Company, Schenectady, NY (US); ExxonMobil Upstream Research Company, Houston, TX (US)

(72) Inventors: Pramod K. Biyani, Greer, SC (US); Scott Walter Leyers, Simpsonville, SC (US); Carlos Miguel Miranda, Greer, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 370 days.

(21) Appl. No.: 14/066,488

(22) Filed: Oct. 29, 2013

(65) Prior Publication Data

US 2014/0123659 A1 May 8, 2014

Related U.S. Application Data

(60) Provisional application No. 61/747,206, filed on Dec. 28, 2012, provisional application No. 61/722,118, (Continued)

(51) Int. Cl.
*F01D 25/14* (2006.01)
*F02C 3/34* (2006.01)
(Continued)

(52) U.S. Cl.
CPC ............. *F01D 25/14* (2013.01); *F01D 25/30* (2013.01); *F02C 3/34* (2013.01); *F02C 7/18* (2013.01);
(Continued)

(58) Field of Classification Search
CPC ...... F02C 3/34; F02C 6/04; F02C 6/10; F02C 7/12; F02C 7/16; F02C 7/18; F02C 7/185;
(Continued)

(56) References Cited

U.S. PATENT DOCUMENTS 2,488,911 A   11/1949   Hepburn et al.
2,884,758 A   5/1959    Oberle
(Continued)

FOREIGN PATENT DOCUMENTS

CA   2231749   9/1998
CA   2645450   9/2007
(Continued)

OTHER PUBLICATIONS

Cho, J. H. et al. (2005) "Marrying LNG and Power Generation," Energy Markets; 10, 8; ABI/INFORM Trade & Industry, 5 pgs.
(Continued)

*Primary Examiner* — Andrew Nguyen
(74) *Attorney, Agent, or Firm* — Fletcher Yoder P.C.

(57) ABSTRACT

A system includes a gas turbine engine that includes a combustor section having one or more combustors configured to generate combustion products, a turbine section having one or more turbine stages between an upstream end and a downstream end, an exhaust section disposed downstream from the downstream end of the turbine section, and a fluid supply system coupled to the exhaust section. The one or more turbine stages are driven by the combustion products. The exhaust section has an exhaust passage configured to receive the combustion products as an exhaust gas. The fluid supply system is configured to route a cooling gas to the exhaust section. The cooling gas has a temperature lower than the exhaust gas. The cooling gas includes an extracted exhaust gas, a gas separated from the extracted exhaust gas,
(Continued)

carbon dioxide, carbon monoxide, nitrogen oxides, or a combination thereof.

20 Claims, 8 Drawing Sheets

Related U.S. Application Data filed on Nov. 2, 2012, provisional application No. 61/722,115, filed on Nov. 2, 2012, provisional application No. 61/722,114, filed on Nov. 2, 2012, provisional application No. 61/722,111, filed on Nov. 2, 2012.

(51) Int. Cl.
  *F01D 25/30* (2006.01)
  *F02C 7/18* (2006.01)
  *F02M 26/22* (2016.01)

(52) U.S. Cl.
  CPC .............. *F02M 26/22* (2016.02); *Y02E 20/16* (2013.01); *Y02T 50/675* (2013.01)

(58) Field of Classification Search
  CPC ........ F05D 2260/20; F23C 9/00; F23C 9/006; F23C 9/06; F23C 9/08; F23C 2202/00; F23C 2202/10; F23C 2202/20; F23C 2202/30; F01D 25/12; F01D 25/125; F01D 25/14; F01D 25/28; F01D 25/30
  See application file for complete search history.

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,603,605 A | 2/1997 | Fonda-Bonardi |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A * | 3/1998 | Golomb ............. F01K 23/106 60/39.12 |
| 5,725,054 A | 3/1998 | Shayegi et al. |

(56) References Cited

U.S. PATENT DOCUMENTS

| | | |
|---|---|---|
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 * | 7/2001 | McCallum ............. F01D 25/12 60/776 |
| 6,269,624 B1 | 8/2001 | Frutschi et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen |
| 6,370,870 B1 | 4/2002 | Kamijo et al. |
| 6,374,591 B1 | 4/2002 | Johnson |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |

(56) References Cited

U.S. PATENT DOCUMENTS

| | | |
|---|---|---|
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |

(56) References Cited

U.S. PATENT DOCUMENTS

| | | |
|---|---|---|
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,438,874 B2 | 5/2013 | Koganezawa et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 8,641,362 B1* | 2/2014 | Liang .............. F01D 9/065 |
| | | 415/1 |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2007/0272797 A1* | 11/2007 | Skurkovich .......... A62C 3/0207 |
| | | 244/98 |
| 2008/0000229 A1 | 1/2008 | Kuspert et al. |
| 2008/0006561 A1 | 1/2008 | Moran et al. |

(56) References Cited

U.S. PATENT DOCUMENTS

| | | |
|---|---|---|
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0083226 A1 | 4/2008 | Joshi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare |
| 2008/0251234 A1 | 10/2008 | Wilson |
| 2008/0290719 A1 | 11/2008 | Kaminsky et al. |
| 2008/0309087 A1 | 12/2008 | Evulet et al. |
| 2009/0000762 A1 | 1/2009 | Wilson |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0257868 A1 | 10/2009 | Fonda-Bonardi |
| 2009/0262599 A1 | 10/2009 | Kohrs et al. |
| 2009/0263243 A1 | 10/2009 | Little et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2009/0317242 A1* | 12/2009 | Down ............... F01D 11/24 415/176 |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0058764 A1* | 3/2010 | Conchieri ......... F01K 23/106 60/739 |
| 2010/0095648 A1* | 4/2010 | Zhang ............... F01K 23/10 60/39.182 |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0278640 A1 | 11/2010 | Ballard, Jr. |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0056179 A1 | 3/2011 | Orosa |
| 2011/0058939 A1 | 3/2011 | Orosa et al. |
| 2011/0072779 A1 | 3/2011 | ElKady et al. |
| 2011/0079017 A1* | 4/2011 | Gulen ............... F01K 23/10 60/783 |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ElKady et al. |
| 2011/0139047 A1* | 6/2011 | Takase ............... C10J 3/48 110/218 |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232298 A1 | 9/2011 | Mahendhra et al. |
| 2011/0232545 A1 | 9/2011 | Clements |
| 2011/0239653 A1 | 10/2011 | Valeev et al. |
| 2011/0265447 A1 | 11/2011 | Cunningham |
| 2011/0289930 A1* | 12/2011 | Draper ............... F02C 3/34 60/772 |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2012/0272655 A1* | 11/2012 | ElKady ............... F02C 3/14 60/772 |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | |
|---|---|---|
| EP | 0770771 | 5/1997 |
| EP | 2261468 A1 | 12/2010 |
| EP | 2336524 A2 | 6/2011 |
| GB | 776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | 2009093315 A1 | 7/2009 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |

(56) References Cited

FOREIGN PATENT DOCUMENTS

| WO | WO2013147633 | 10/2013 |
|----|--------------|---------|
| WO | WO2013155214 | 10/2013 |
| WO | WO2013163045 | 10/2013 |

OTHER PUBLICATIONS

Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, 4 pgs.

Nanda, R. et al. (2007) "Utilizing Air Based Technologies as Heat Source for LNG Vaporization," presented at the 86th Annual convention of the Gas Processors of America (GPA 2007), , San Antonio, TX; 13 pgs.

Rosetta, M. J. et al. (2006) "Integrating Ambient Air Vaporization Technology with Waste Heat Recovery—A Fresh Approach to LNG Vaporization," presented at the 85th annual convention of the Gas Processors of America (GPA 2006), Grapevine, Texas, 22 pgs.

Ahmed, S. et al. (1998) "Catalytic Partial Oxidation Reforming of Hydrocarbon Fuels," *1998 Fuel Cell Seminar*, Nov. 16-19, 1998, 7 pgs.

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm., CEC 500-2006-074*, 80 pgs.

Baxter, E. et al. (2003) "Fabricate and Test an Advanced Non-Polluting Turbine Drive Gas Generator," *U S. Dept. of Energy, Nat'l Energy Tech. Lab., DE-FC26-00NT 40804*, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, Mar. 2002, 42 pgs.

Comparison of Ion Transport Membranes—Fourth Annual Conference on Carbon Capture and Sequestration DOE/NETL; May 2005.

Ciulia, Vincent. About.com. Auto Repair. How the Engine Works. 2001-2003.

Cryogenics. Science Clarified. 2012. http://www.scienceclarified.com/Co-Di/Cryogenics.html.

Defrate, L. A. et al. (1959) "Optimum Design of Ejector Using Digital Computers" Chem. Eng. Prog. Symp. Ser., 55 ( 21) pp. 46.

Ditaranto, M. et al. (2006) "Combustion Instabilities in Sudden Expansion Oxy-Fuel Flames," ScienceDirect, Combustion and Flame, v.146, Jun. 30, 2006, pp. 493-451.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.

Ertesvag, I. S. et al. (2005) "Exergy Analysis of a Gas-Turbin Combined-Cycle Power Plant With Precombustion $CO_2$ Capture," Elsivier, 2004, pp. 5-39.

Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.

Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.

http://www.turbineinletcooling.org/resources/papers/CTIC_WetCompression_Shepherd_ASMETurboExpo2011.pdf Jun. 2011.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE 71749*, 10 pgs.

Reeves, S. R. (2003) "Enhanced Coalbed Methane Recovery," *SPE 101466-DL*, 8 pgs.

Richards, G. A. et al. (2001) "Advanced Steam Generators," *National Energy Technology Laboratory*, 7 pgs.

Snarheim, D. et al. (2006) "Control Design for a Gas Turbine Cycle With $CO_2$ Capture Capabilities," *Modeling, Identification and Control*, vol. 00, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

vanHemert, P. et al. (2006) "Adsorption of Carbon Dioxide and a Hydrogen-Carbon Dioxide Mixture," *Intn'l Coalbed Methane Symposium (Tuscaloosa, AL) Paper 0615*, 9 pgs.

Zhu, J. et al. (2002) "Recovery of Coalbed Methane by Gas Injection," *SPE 75255*, 15 pgs.

U.S. Appl. No. 13/596,684, filed Aug. 28, 2012, Slobodyanskiy et al.

U.S. Appl. No. 14/066,579, filed Oct. 29, 2013, Huntington et al.

U.S. Appl. No. 14/066,551, filed Oct. 29, 2013, Minto.

U.S. Appl. No. 14/144,511, filed Dec. 30, 2013, Thatcher et al.

U.S. Appl. No. 14/067,559, filed Oct. 30, 2013, Lucas John Stoia et al.

PCT/RU2013/000162, filed Feb. 28, 2013, General Electric Company.

U.S. Appl. No. 14/067,679, filed Oct. 30, 2013, Elizabeth Angelyn Fadde et al.

U.S. Appl. No. 14/067,714, filed Oct. 30, 2013, Carolyn Ashley Antoniono et al.

U.S. Appl. No. 14/067,726, filed Oct. 30, 2013, Carolyn Ashley Antoniono et al.

U.S. Appl. No. 14/067,731, filed Oct. 30, 2013, Carolyn Ashley Antoniono et al.

U.S. Appl. No. 14/067,739, filed Oct. 30, 2013, Carolyn Ashley Antoniono et al.

U.S. Appl. No. 14/067,797, filed Oct. 31, 2013, Anthony Wayne Krull et al.

U.S. Appl. No. 14/066,488, filed Oct. 29, 2013, Pramod K. Biyani et al.

U.S. Appl. No. 14/135,055, filed Dec. 19, 2013, Pramod K. Biyani et al.

U.S. Appl. No. 14/067,844, filed Oct. 30, 2013, John Farrior Woodall et al.

PCT/US13/036020, Apr. 10, 2013, General Electric Company/ExxonMobil Upstream Company.

U.S. Appl. No. 14/067,486, filed Oct. 30, 2013, Huntington et al.

U.S. Appl. No. 14/067,537, filed Oct. 30, 2013, Huntington et al.

U.S. Appl. No. 14/067,552, filed Oct. 30, 2013, Huntington et al.

U.S. Appl. No. 14/067,563, filed Oct. 30, 2013, Huntington et al.

International Search Report and Written Opinion PCT/US2013/067901 mailed on Mar. 27, 2014.

(56) References Cited

OTHER PUBLICATIONS

English Translation of First Chinese Office Action and Search Report; Application No. CN201380069067.4; Dated Jan. 29, 2016; 38 pages.
International Search Report from PCT application No. PCT/US2014/011148, dated Mar. 27, 2014, 11 pgs.

* cited by examiner

SYSTEM AND METHOD FOR PROTECTING COMPONENTS IN A GAS TURBINE ENGINE WITH EXHAUST GAS RECIRCULATION

CROSS-REFERENCE TO RELATED APPLICATIONS

This application claims priority to and benefit of U.S. Provisional Patent Application No. 61/747,206, entitled "SYSTEM AND METHOD FOR PROTECTING COMPONENTS IN A GAS TURBINE ENGINE WITH EXHAUST GAS RECIRCULATION," filed on Dec. 28, 2012, U.S. Provisional Patent Application No. 61/722,118, entitled "SYSTEM AND METHOD FOR DIFFUSION COMBUSTION IN A STOICHIOMETRIC EXHAUST GAS RECIRCULATION GAS TURBINE SYSTEM," filed on Nov. 2, 2012, U.S. Provisional Patent Application No. 61/722,115, entitled "SYSTEM AND METHOD FOR DIFFUSION COMBUSTION WITH FUEL-DILUENT MIXING IN A STOICHIOMETRIC EXHAUST GAS RECIRCULATION GAS TURBINE SYSTEM," filed on Nov. 2, 2012, U.S. Provisional Patent Application No. 61/722,114, entitled "SYSTEM AND METHOD FOR DIFFUSION COMBUSTION WITH OXIDANT-DILUENT MIXING IN A STOICHIOMETRIC EXHAUST GAS RECIRCULATION GAS TURBINE SYSTEM," filed on Nov. 2, 2012, and U.S. Provisional Patent Application No. 61/722,111, entitled "SYSTEM AND METHOD FOR LOAD CONTROL WITH DIFFUSION COMBUSTION IN A STOICHIOMETRIC EXHAUST GAS RECIRCULATION GAS TURBINE SYSTEM," filed on Nov. 2, 2012, all of which are herein incorporated by reference in their entirety for all purposes.

BACKGROUND OF THE INVENTION

The subject matter disclosed herein relates to gas turbine engines, and more specifically, to systems and methods for protecting components in gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion products. Unfortunately, certain components of the combustor section and an exhaust section are exposed to high temperatures, which can result in thermal expansion, stress, and/or wear on the components. The exhaust gas can also leak into certain cavities of the combustor section and/or the exhaust section, where the components may have a lower resistance to the high temperature exhaust gas. Furthermore, gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine that includes a combustor section having one or more combustors configured to generate combustion products and a turbine section having one or more turbine stages between an upstream end and a downstream end. The one or more turbine stages are driven by the combustion products. The gas turbine engine also includes an exhaust section disposed downstream from the downstream end of the turbine section. The exhaust section has an exhaust passage configured to receive the combustion products as an exhaust gas. The gas turbine engine also includes a fluid supply system coupled to the exhaust section. The fluid supply system is configured to route a cooling gas to the exhaust section. The cooling gas has a temperature lower than the exhaust gas. The cooling gas includes an extracted exhaust gas, a gas separated from the extracted exhaust gas, carbon dioxide, carbon monoxide, nitrogen oxides, or a combination thereof.

In a second embodiment, a system includes a turbine exhaust section configured to mount downstream from a turbine section of a gas turbine engine. The turbine exhaust section includes an exhaust passage configured to receive exhaust gas from the turbine section, and a cooling gas passage extending through a structure of the turbine exhaust section. The system also includes a fluid supply system coupled to the exhaust section. The fluid supply system is configured to route a cooling gas to the cooling gas passage in the exhaust section. The cooling gas has a temperature lower than the exhaust gas. The cooling gas includes an extracted exhaust gas, a gas separated from the extracted exhaust gas, carbon dioxide, carbon monoxide, nitrogen oxides, or a combination thereof.

In a third embodiment, a system includes a turbine exhaust section configured to mount downstream from a turbine section of a gas turbine engine. The turbine exhaust section includes an exhaust passage configured to receive exhaust gas from the turbine section, and a cooling gas passage extending through a structure of the turbine exhaust section to route a cooling gas to the turbine exhaust section. The cooling gas has a temperature lower than the exhaust gas. The cooling gas includes an extracted exhaust gas, a gas separated from the extracted exhaust gas, carbon dioxide, carbon monoxide, nitrogen oxides, or a combination thereof.

In a fourth embodiment, a method includes combusting a fuel with an oxidant and an exhaust gas in a combustion portion of a turbine combustor to generate combustion products, driving a turbine with the combustion products from the turbine combustor, expanding and cooling the combustion products from the turbine through an exhaust passage in an exhaust section, and routing a cooling gas from a fluid supply system to the exhaust section. The cooling gas includes an extracted exhaust gas, a gas separated from the extracted exhaust gas, carbon dioxide, carbon monoxide, nitrogen oxides, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
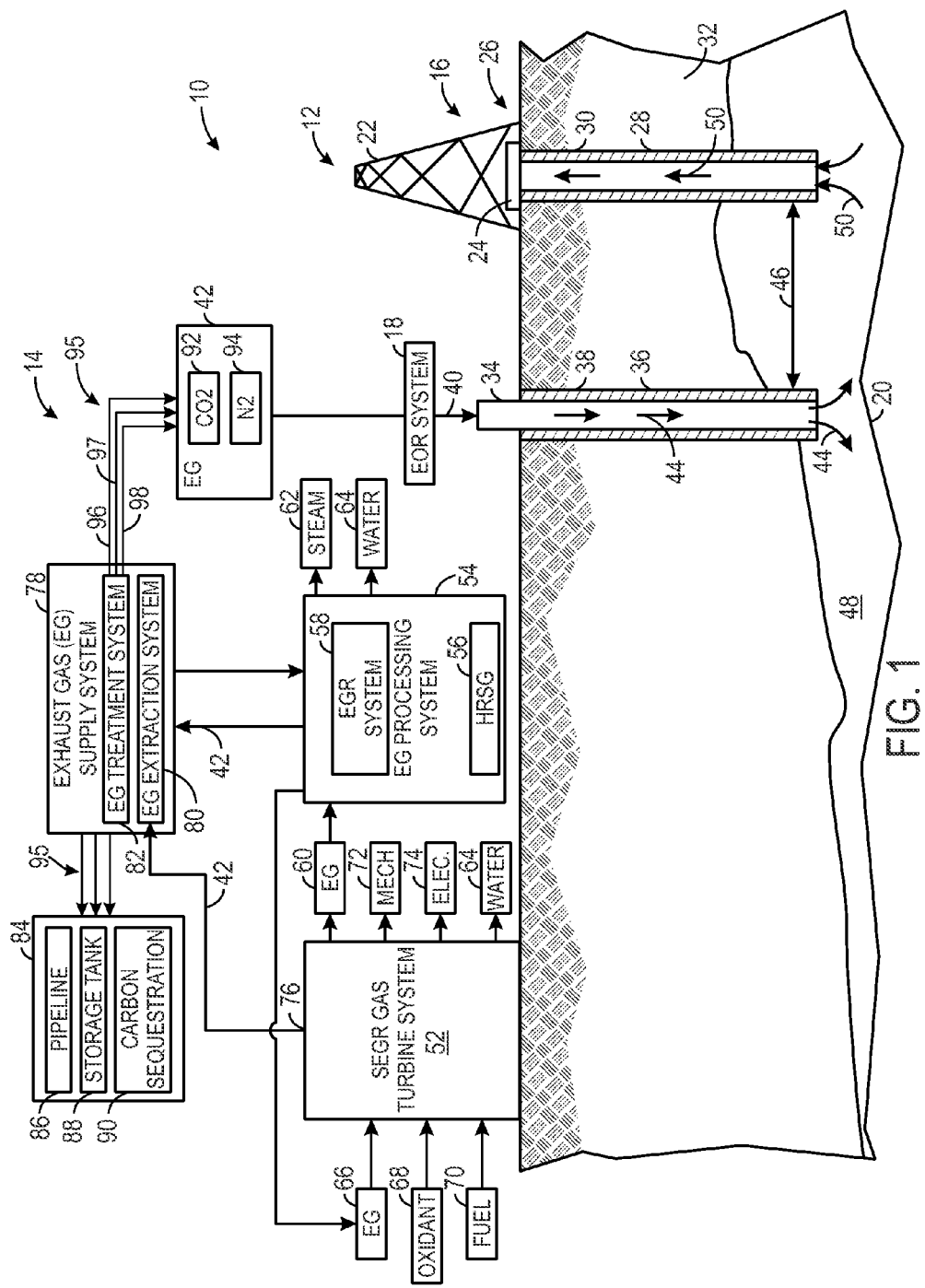
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames (e.g., using diffusion fuel nozzles), premix flames (e.g., using premix fuel nozzles), or any combination thereof. In certain embodiments, the diffusion flames may help to maintain stability and operation within certain limits for stoichiometric combustion, which in turn helps to increase production of $CO_2$. For example, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

The disclosed embodiments provide systems and methods for protecting components (e.g., via a protective gas flow) of gas turbine engines with EGR. The gas turbine engine may include a turbine section having one or more turbine stages between an upstream end and a downstream end. The gas turbine engine may also include an exhaust section disposed downstream from the downstream end of the turbine section. Further, the gas turbine engine may include a fluid supply system (e.g., a protective or inert gas supply) coupled to the exhaust section. The fluid supply system may route a protective gas (e.g., an inert gas) to the exhaust section of the gas turbine engine. For example, the protective gas may be substantially or entirely free of oxygen, air, or any combination thereof, and the protective gas also may be substantially or entirely free of fuel or unburnt hydrocarbons. Accordingly, the protective gas may be described as an oxygen-free or substantially oxygen-free protective gas, and also a fuel-free or substantially fuel-free protective gas. The protective gas may include an inert gas, which may be a noble gas or substantially non-reactive gas. Although a variety of protective gases may be used in the disclosed embodiments, the following discussion focuses on inert gases as nonlimiting examples. Examples of the inert gas routed by the fluid supply system include, but are not limited to, nitrogen, carbon dioxide, argon, exhaust gas, or any combination thereof. The inert gas may be used for cooling, purging, fluidly sealing, or diluting cavities in various structures and components of the exhaust section. For example, the inert gas routed by the fluid supply system may be used to cool an outer shroud cavity, an inner shroud cavity, a vane, a bearing cavity, or any combination thereof. The inert gas may be routed from the fluid supply system to one or more of these structures or components via an inert gas passage coupled to the fluid supply system.

As a temperature of the inert gas routed from the fluid supply system may be less than a temperature of the exhaust gas flowing through an exhaust passage of the exhaust section, the inert gas may help to cool the structures and components of the exhaust section. Thus, the inert gas may help to extend the life of the components and structures of the exhaust section. After cooling the components and structures of the exhaust section, the inert gas may combine with the exhaust gas flowing through the exhaust passage of the exhaust section. In certain embodiments, the use of the inert gas for cooling in the exhaust section may provide several advantages compared to other cooling fluids, such as air. For example, the exhaust gas from the gas turbine engine may be used in certain applications in which a low concentration of oxygen in the exhaust gas is desired. Compared to air, the inert gas may include little to no oxygen. Thus, use of the inert gas for cooling of the exhaust section may introduce little to no oxygen to the exhaust gas. In addition, various oils and lubricants may be used in the exhaust section of the gas turbine engine. During cooling of the exhaust section, the inert gas may come in contact with one or more of the lubricants or oils. Compared to air, the inert gas may cause little to no degradation of the oils and/or lubricants. In other words, the inert gas is generally non-reactive with the oils and/or lubricants. Thus, use of the inert gas for cooling the exhaust section may extend the life of the oils and lubricants used in the exhaust section. Additionally or alternatively, less expensive oils and/or lubricants may be used in the exhaust section when using inert gas for cooling. Further, the inert gas may be used to help purge and/or dilute any exhaust gas leakage into the cavities of the exhaust section. Additionally or alternatively, the inert gas may be used to pressurize the cavities to resist leakage of exhaust gas into the cavities.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or percent by volume. In contrast, the $CO_2$ lean, $N_2$ rich stream 98 may have a $CO_2$ purity or concentration level of less than approximately 1, 2, 3, 4, 5, 10, 15, 20, 25, or percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
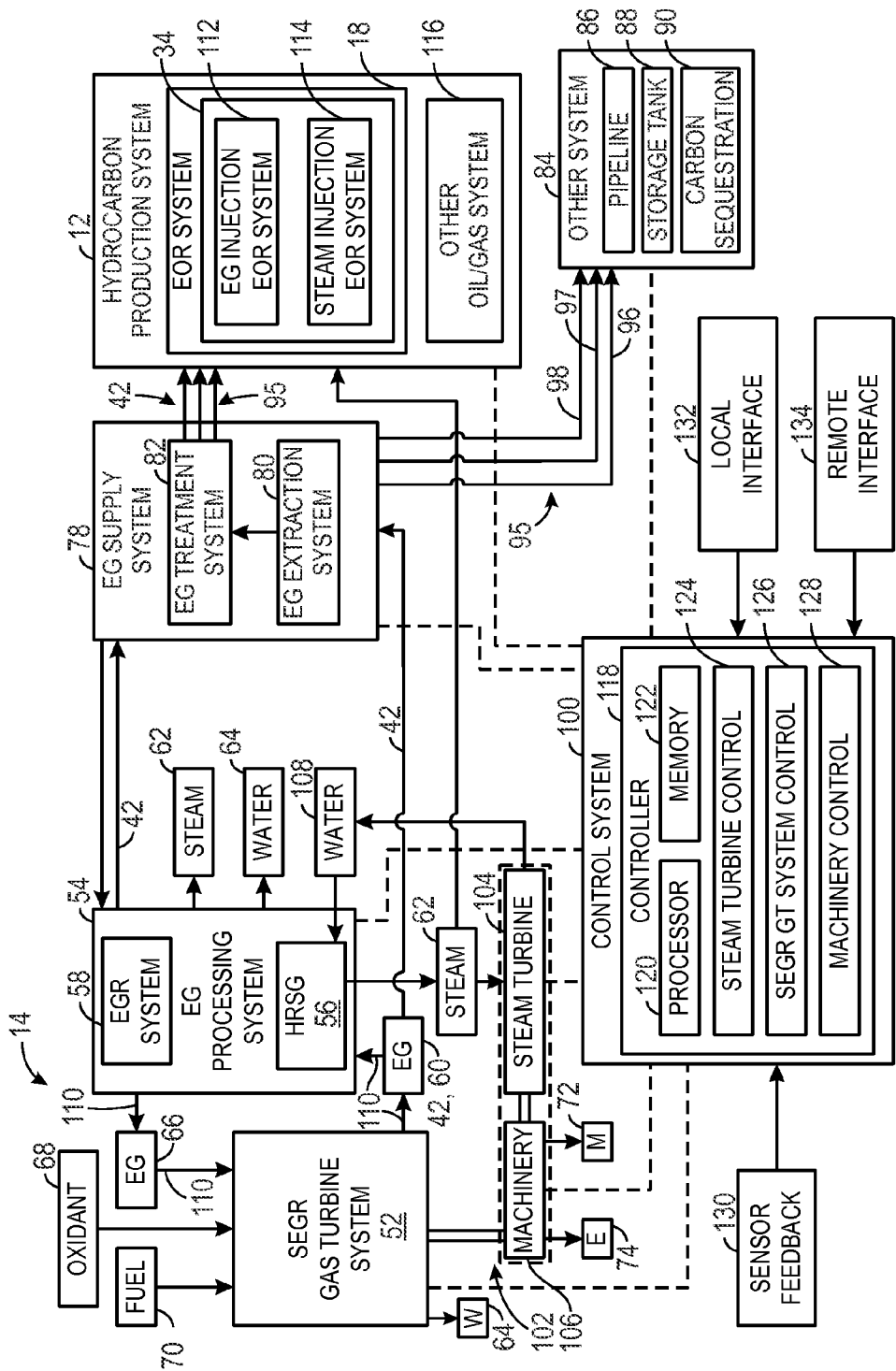
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_x$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
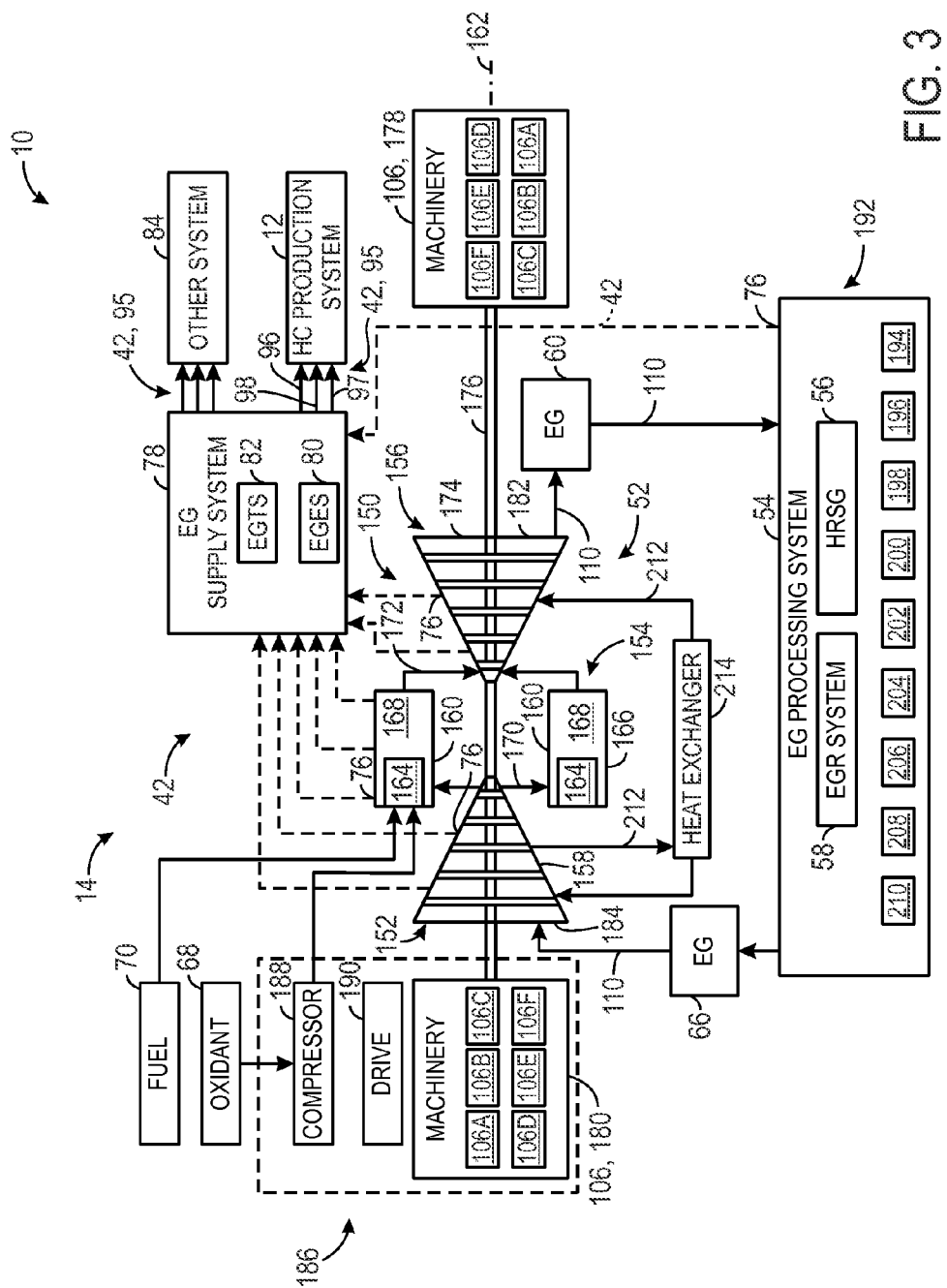
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|---|---|---|---|---|---|
| MOC | GEN | | | | |
| MOC | GBX | GEN | | | |
| LP MOC | HP MOC | GEN | | | |
| MOC MOC | GBX | GEN | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX | LP MOC | GEN | | |
| MOC | CLR | MOC | | | |
| HP MOC | GBX | LP MOC | GBX | GEN | |
| MOC | CLR | MOC | | | |
| HP MOC | GBX | LP MOC | GEN | | |
| MOC | HTR STGN | MOC | | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the CO₂ rich, N₂ lean stream 96, the intermediate concentration CO₂, N₂ stream 97, and the CO₂ lean, N₂ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
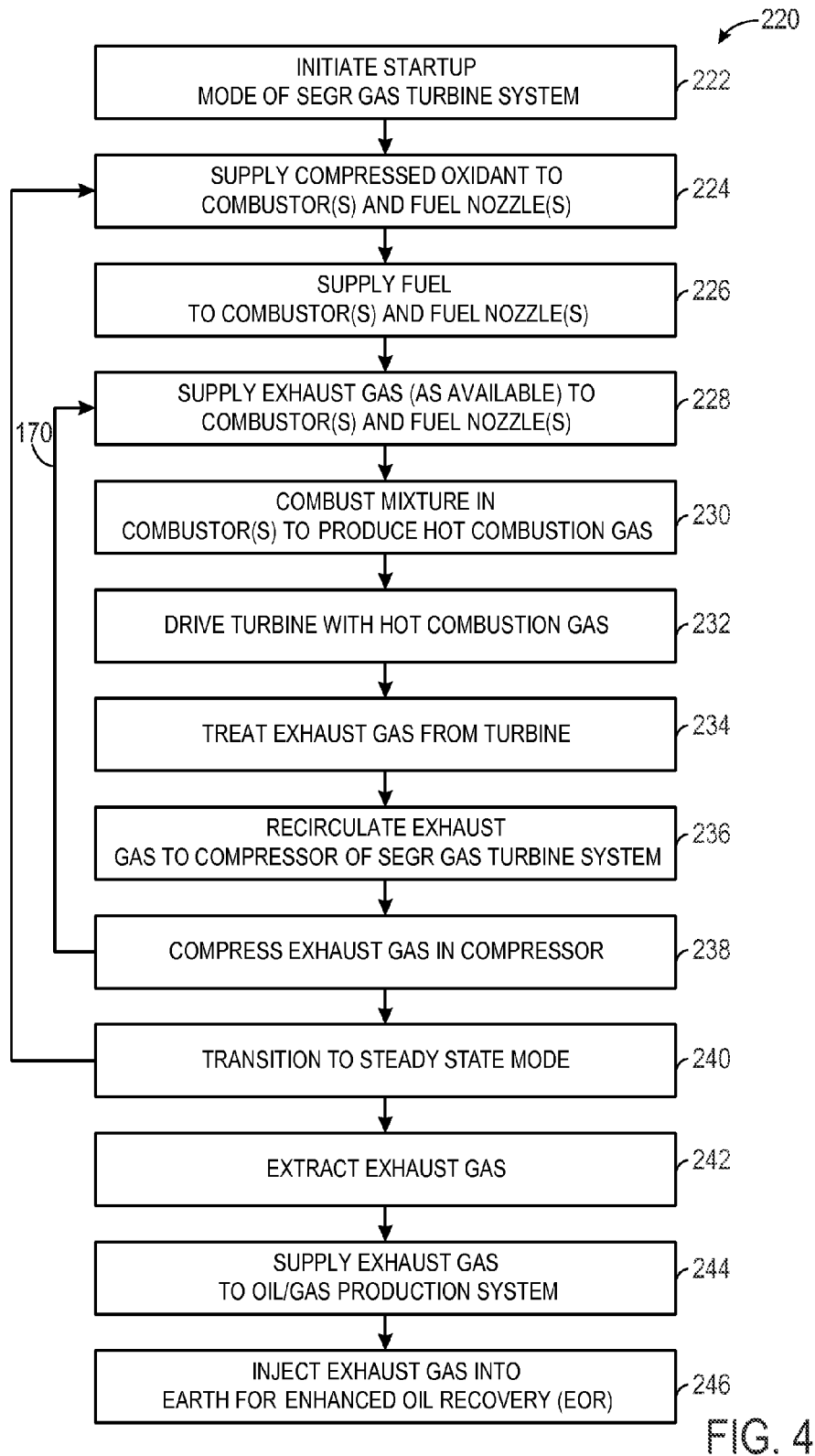
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

Figure 5:
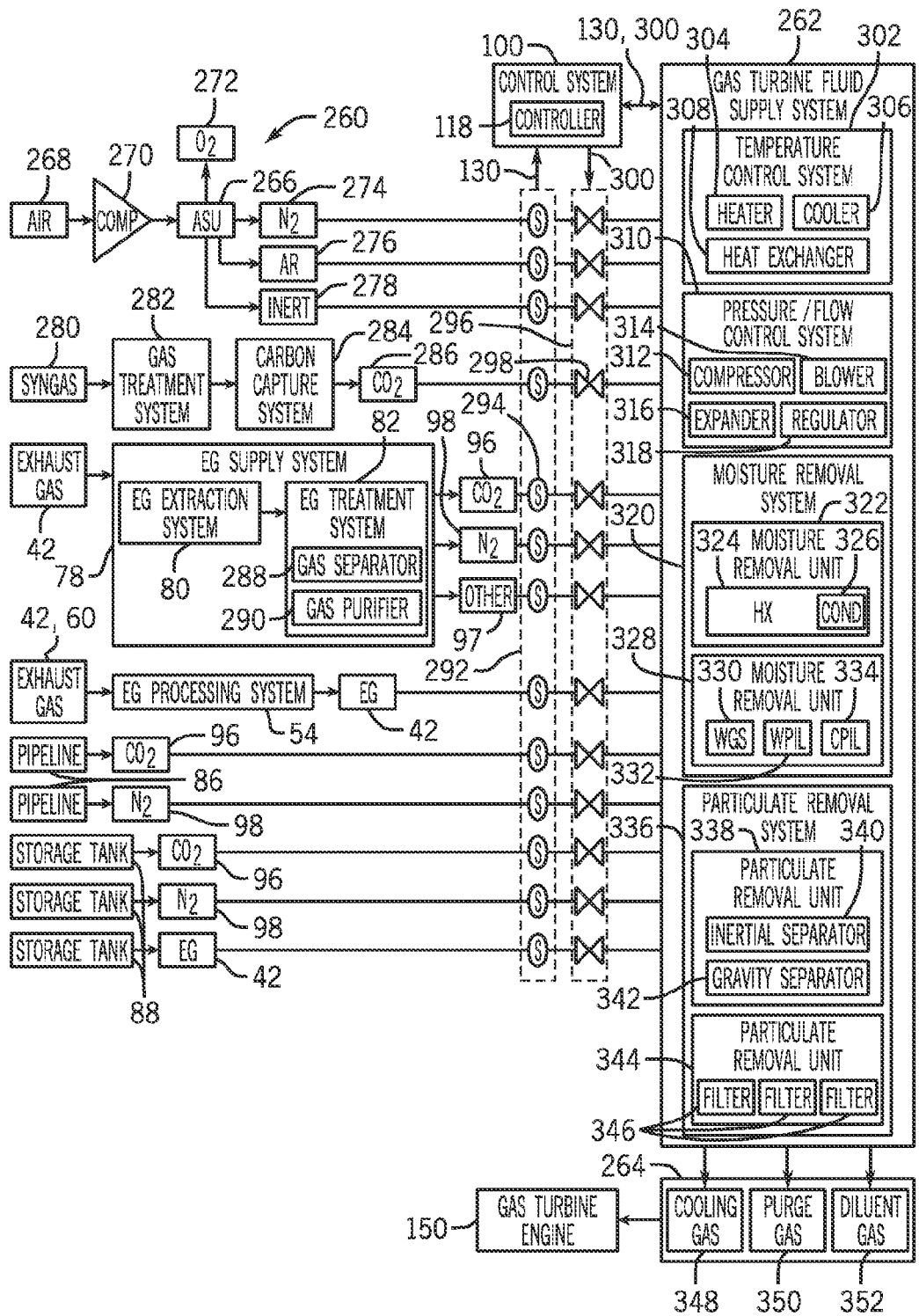
FIG. 5 is a diagram of a fluid supply system for a gas turbine engine.

FIG. 5 is a diagram of an embodiment of the gas turbine engine 150 using a protective fluid (e.g., a gas) for cooling, purging, and/or diluting cavities in various structures and components of the gas turbine engine 150. For example, the protective fluid may be an inert gas used for cooling the gas turbine engine 150. As illustrated, one or more sources 260 of inert gases may be provided to a gas turbine fluid supply system 262, which supplies one or more inert gases 264 to the gas turbine engine 150. For example, an air separation unit (ASU) 266 may receive air 268 via a compressor 270. The ASU 266 may operate to separate the air 268 into component gases by, for example, distillation techniques. For example, the ASU 266 may separate oxygen 272 from the air 268 supplied to it from the compressor 270. Additionally, the ASU 266 may separate nitrogen 274, argon 276, or other inert gases 278 from the air 268. Any of the gases 274, 276, and/or 278 may be used as one of the inert gases 264 supplied to the gas turbine engine 150 by the fluid supply system 262.

In other embodiments, a syngas 280, or synthetic gas, may be generated by a gasification process. The syngas 280 may include a mixture of carbon monoxide and hydrogen. The syngas 280 may be supplied to a gas treatment system 282 to remove various impurities or other undesired components from the syngas 280. In certain embodiments, the treated syngas from the gas treatment system 282 may be supplied to a carbon capture system 284, which may remove and process the carbonaceous gas (e.g., carbon dioxide) included in the syngas 280. The carbon capture system 284 may include a compressor, a purifier, a pipeline, a storage tank, or any combination thereof. For example, the carbon capture system 284 may include gas separators and/or purifiers, such as solvent-based gas separators and purifiers, for removing or separating carbon dioxide from a fluid. Carbon dioxide 286 generated by the carbon capture system 284 may be used as one of the inert gases 264 supplied to the gas turbine engine 150 by the fluid supply system 262.

As discussed in detail above, the exhaust gas supply system 78 may receive the exhaust gas 42. The exhaust gas supply system 78 may include the exhaust gas extraction system 80 and the exhaust gas treatment system 82. In certain embodiments, the exhaust gas treatment system 82 includes a gas separator 288 and a gas purifier 290, either or both of which may be solvent-based units, such as absorbers, flash tanks, and so forth. The gas separator 288 may separate the exhaust gas 42 into one or more streams each containing primarily one component. The gas purifier 290 may further purify the streams generated by the gas separator 288. For example, the exhaust gas supply system 78 may generate the first, second, and third streams 96, 97, and 98. As discussed above, the first stream 96 may have a first composition that is rich with carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich steam). One or more of the first, second, or third streams 96, 97, or 98 may be supplied as the inert gas 264 to the gas turbine engine 150 via the fluid supply system 262. In other embodiments, the exhaust gas 42 and/or 60 may be supplied to the exhaust gas processing system 54 to generate the exhaust gas 42, which may also be supplied as the inert gas 264 to the gas turbine engine 150.

In further embodiments, one or more pipelines 86 may be used to supply carbon dioxide 96 and/or nitrogen 98 as the inert gas 264 to the gas turbine engine 150. Additionally or alternatively, one or more storage tanks 88 may be used to store one or more of the carbon dioxide 96, nitrogen 98, or exhaust gas 42. These gases may be supplied from the storage tanks 88 as the inert gas 264 to the gas turbine engine 150. The pipelines 86 and/or storage tanks 88 may be used as a secondary source of the inert gas 264. For example, in certain embodiments, the inert gas 264 may be primarily supplied by the exhaust gas supply system 78 or the exhaust gas processing system 54. However, when the inert gas 264 is not available from either system 78 or 54, or when either system 78 or 54 is not operational (e.g., during startup), the inert gas 264 may be supplied via the pipeline 86 and/or the storage tank 88. Similarly, the pipeline and/or storage tank 88 may be used as a supplemental source of the inert gas 264 in embodiments using the ASU 266 or the syngas 280 to supply the primary source of the inert gas 264. In further embodiments, a first inert gas may be used during startup and a second inert gas may be used during steady-state conditions.

In certain embodiments, a sensor system 292 may provide the sensor feedback 130 to the controller 118 of the control system 100. Specifically, the sensor system 292 may include one or more sensors 294 disposed on, along, or in conduits conveying the inert gases 264 from the sources 260. For example, the sensors 294 may include temperature sensors, pressure sensors, flow rate sensors, gas composition sensors, or any combination thereof. Examples of gas composition sensors include oxygen sensors, fuel sensors, or any combination thereof. In certain embodiments, the conduits conveying the inert gases 264 from the sources 260 may also include a control element system 296. Specifically, the control element system 296 may include one or more control elements 298, such as control valves, restriction orifices, flow regulators, expanders, compressors, or similar devices. For example, the control elements 298 may receive output signals 300 from the controller 118 of the control system 100 based on the sensor feedback 130. For example, the sensor 294 may indicate a flow rate of the inert gas 264 below a desired threshold. Based on the sensor feedback 130, the controller 118 may send the output signal 300 to the control element 298 to further open to increase the flow rate of the inert gas 264. In certain embodiments, the controller 118 may also receive sensor feedback 130 from the fluid supply system 262 and/or send output signals 300 to the fluid supply system 262 to facilitate control of the inert gas flow to the gas turbine engine 150.

The gas turbine fluid supply system 262 may include one or more systems to process or handle the inert gas 264 supplied by the source 260 prior to supplying the inert gas 264 to the gas turbine engine 150, e.g., for cooling, purging, diluting, and/or fluidly sealing the exhaust section of the gas turbine engine 150. Specifically, the fluid supply system 262 may include one or more of the systems shown in FIG. 5 and discussed below in any series and/or parallel arrangement, in any order. For example, the fluid supply system 262 may include a temperature control system 302 to adjust a temperature of the inert gas 264. For example, the temperature control system 302 may include a heater 304, a cooler 306, a heat exchanger 308, or any combination thereof. The heat exchanger 308 may be a direct or indirect heat exchanger. For example, direct heat exchangers may employ direct contact with a cooling medium, such as water (e.g., a spray) and indirect heat exchangers may separate fluids via finned tube heat exchangers or the like. The heater 304 may be used to increase the temperature of the inert gas 264 and the cooler 306 may be used to decrease the temperature of the inert gas 264. The heat exchanger 308 may be used to exchange heat between the inert gas 264 and other process streams (e.g., water, steam, etc.) to either increase or decrease the temperature of the inert gas 264. In addition, a pressure/flow control system 310 may be used to adjust a pressure and/or flow rate of the inert gas 264. For example, the pressure/flow control system 310 may include a compressor 312, a blower 314, an expander 316, a regulator 318, or any combination thereof. The compressor 312 may be used to increase the pressure of the inert gas 264 and/or adjust the flow rate of the inert gas 264. Similarly, the blower 314 may be used to increase the pressure of the inert gas 264 and/or adjust the flow rate of the inert gas 264. The expander 316 may be used to decrease the pressure of the inert gas 264 and/or adjust the flow rate of the inert gas 264. Similarly, the regulator 318 may be used to decrease the pressure of the inert gas 264 and/or regulate (e.g., make more constant or uniform) the flow rate of the inert gas 264. In other embodiments, similar devices, such as control valves, may be used to adjust the pressure and/or flow rate of the inert gas 264.

A moisture removal system 320 may be used to adjust a moisture content of the inert gas 264. For example, the moisture removal system 320 may include a first moisture removal unit 322 that includes a heat exchanger 324, which may include a condenser 326. The heat exchanger 324 (e.g., condenser 326) may be used to decrease the temperature of the inert gas 264, thereby decreasing the amount of moisture capable of being contained in the inert gas 264. Thus, excess moisture that condenses in the moisture removal unit 322 may be removed from the inert gas 264 resulting in the inert gas 264 containing less moisture. A second moisture removal unit 328 may include a water gas separator (WGS) system 330, a water impermeable filter (WFIL) 332, a coalescing filter (CFIL), or any combination thereof. In the WGS system 330, water may be removed via a variety of chemical, physical, or other means. The WFIL 332 and/or CFIL 334 may be used to directly remove water from the inert gas 264 via filtration. In addition, a particulate removal system 336 may remove particulates from the inert gas 264. For example, in a first particulate removal unit 338, an inertial separator 340 and/or a gravity separator 342 may be used to remove particulates from the inert gas 264. In a second particulate removal unit 344, one or more filters 346 may be used to remove particulates from the inert gas 264.

By using one or more of the systems 302, 310, 320, and/or 336 in the fluid supply system 262, the quality and/or properties of the inert gas 264 may be improved or modified to a desired level for use in protecting (e.g., cooling, purging, and/or fluidly sealing) components in the gas turbine engine 150. For example, as the inert gas 264 is used for cooling in the gas turbine engine 150, reducing the temperature of the inert gas 264 using the temperature control system 302 may be desirable to improve the cooling capacity of the inert gas 264. In addition, certain components of the gas turbine engine 150 may have temperature and/or pressure limitations. Thus, the temperature control system 302 and/or the pressure/flow control system 310 may be used to adjust the properties of the inert gas 264 to be within the limitations of the gas turbine engine 150. The pressure/flow control system 310 may also be used to adjust the pressure of the inert gas 264 to be higher than that of the exhaust gas, thereby blocking leakage of the exhaust gas into cavities of the gas turbine engine 150. Similarly, moisture in the gas turbine engine 150 may cause corrosion or other undesired chemical reactions. Thus, the moisture removal system 320 may be used to remove any moisture contained in the inert gas 264 before being supplied to the gas turbine engine 150. This moisture control system 320 may extend the life of certain components, such as bearings, while also helping to protect the oils and/or lubricants. The gas turbine engine 150 may have small operating clearances between certain components. Thus, the particulate removal system 336 may be used to remove particulates that may cause damage or other undesired consequences to the components of the gas turbine engine 150. In other embodiments, the fluid supply system 262 may include other systems to further condition, treat, or modify the inert gas 264 prior to being supplied to the gas turbine engine 150.

As discussed above, the inert gas 264 may be provided to the gas turbine engine 150 for a variety of purposes. For example, the inert gas 264 may be used as a cooling gas 348, as discussed in detail below. For example, the cooling gas 348 may be used to cool various components of the turbine section 156. In other embodiments, the inert gas 264 may be used as a purge gas 350. For example, the purge gas 350 may be used to purge various portions of the gas turbine engine 150 for a startup, a shutdown, a turnaround, maintenance, and so forth. In further embodiments, the inert gas 264 may be used as a diluent gas 352. For example, the diluent gas 352 may be used to decrease $NO_x$ emissions of the gas turbine engine 150 or otherwise adjust the operating conditions of the gas turbine engine 150. In these various applications of the inert gas 264, it may be desirable for the inert gas 264 to have little to no oxygen. Specifically, when the gas turbine engine 150 is part of the SEGR gas turbine system 52, it may be desirable to exclude oxygen from the exhaust gas 42, such as when the exhaust gas 42 is used in the oil/gas extraction system 16 or the EOR system 18. When the inert gas 264 is used for the cooling gas 348, purge gas 350, and/or diluent gas 352, some of these gases may enter or combine with the exhaust gas 42. Thus, by using inert gas 264 that has little to no oxygen, the low oxygen concentration of the exhaust gas 42 may be maintained. In addition, the inert gas 264 may have various purity levels, such as approximately 75, 80, 85, 90, 95, 97.5, or 99 percent purity by volume.

Figure 6:
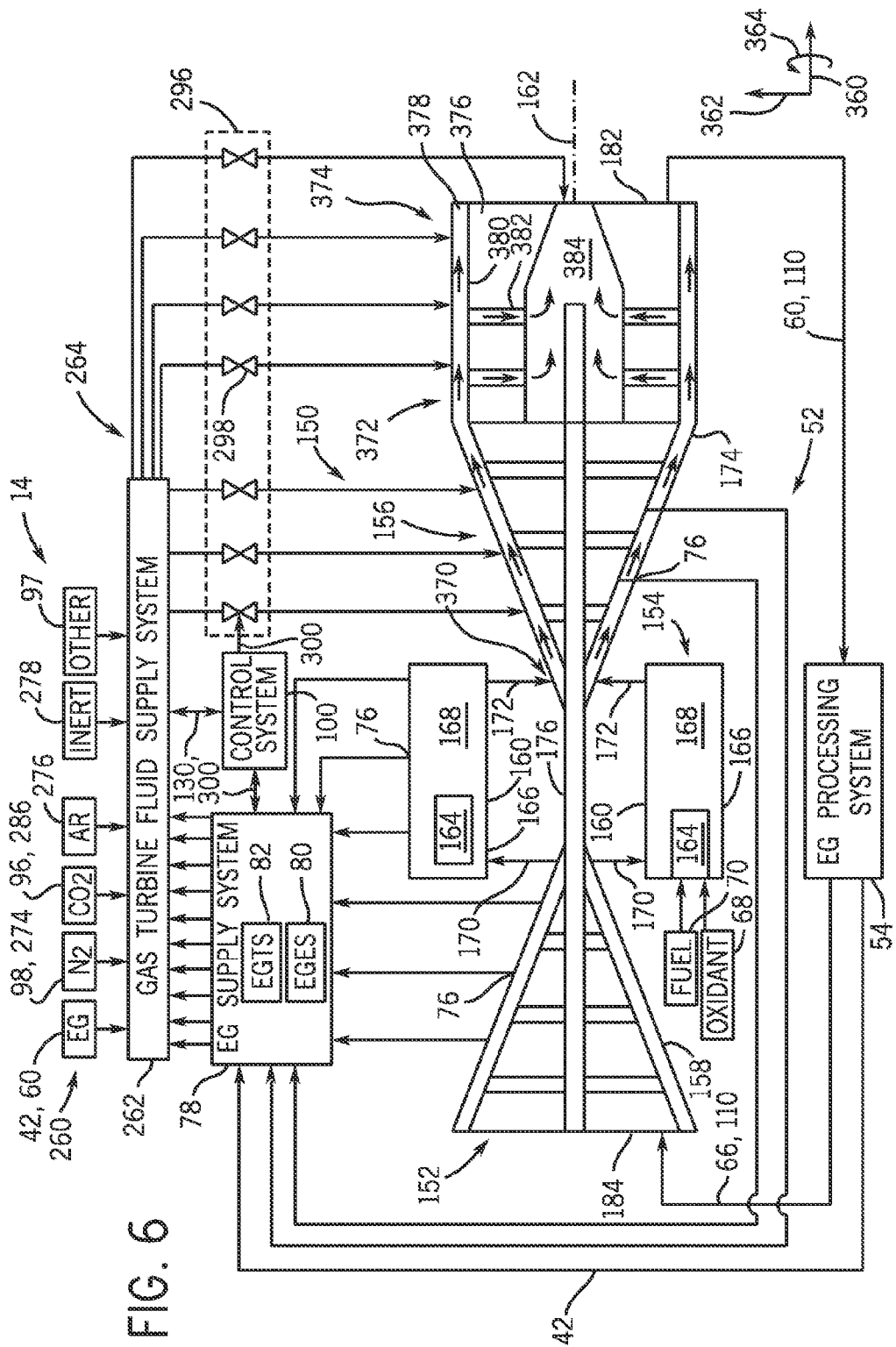
FIG. 6 is a diagram of an embodiment of a fluid supply system coupled to a gas turbine engine.

FIG. 6 is a diagram of the gas turbine engine 150 coupled to the gas turbine fluid supply system 262. Elements in FIG. 6 in common with those shown in previous figures are labeled with the same reference numerals. The axial direction of the gas turbine engine 150 is indicated by arrow 360, the radial direction is indicated by arrow 362, and the circumferential direction is indicated by arrow 364. These direction are all with respect to the rotational axis 162. In the illustrated embodiment, the turbine section 156 include an upstream end 370 and a downstream end 372. Specifically, the products of combustion 172 enter the upstream end 370 and exit the downstream end 372 as the exhaust gas 60. An exhaust section 374 is disposed downstream from the downstream end 372 of the turbine section 156. The exhaust section 374 may include bearings associated with the shaft 176. In addition, the exhaust section 374 may be used to expand and/or cool the products of combustion 172 before venting the exhaust gas 60 to the exhaust recirculation path 110. Thus, the exhaust section 374 may be exposed to high temperatures for prolonged periods. As shown in FIG. 6, the exhaust section 374 may include an exhaust passage 376 in fluid communication with the turbine section 156 and an inert gas passage 378 coupled to the fluid supply system 264.

As described in detail below, the products of combustion 172 (e.g., exhaust gas 60) may flow through the exhaust passage 376. The inert gas 264 may flow through the inert gas passage 378 to cool, purge, and/or fluidly seal one or more components of the exhaust section 374 before discharging into the exhaust passage 376 and mixing with the exhaust gas 60 of the exhaust section 374. In other words, the inert gas passage 378 may be fluidly coupled to the exhaust passage 376. In other embodiments, the inert gas passage 378 may be isolated from the exhaust passage 376. For example, the inert gas 264 may be discharged from the system, and possibly recirculated through the fluid supply system 262. In certain embodiments, a wall 380 may be disposed along the exhaust passage 376 and the wall 380 may separate the exhaust passage 376 from the inert gas passage 378. The wall 380 may extend circumferentially 364 (e.g., annular, rectangular, etc.) about the rotational axis 162. In some embodiments, one or more vanes 382 may protrude into the exhaust passage 376. The vanes 382 may be used to further route the inert gas 264 through the exhaust section 374. For example, the vanes 382 may be used to route the inert gas 264 to a bearing cavity 384 located about the shaft 176. By flowing the inert gas 264 through the passage 378, vanes 382, and/or bearing cavity 384, the inert gas 264 may be used to cool, purge, and/or fluidly seal various components of the exhaust section 374, thereby increasing the reliability and lifetimes of the components. In addition, as the inert gas 264 is generally low in oxygen content, use of the inert gas 264 may result in maintaining the low concentration of oxygen in the exhaust gas 60, which may be desirable with SEGR gas turbine systems 52.

Figure 7:
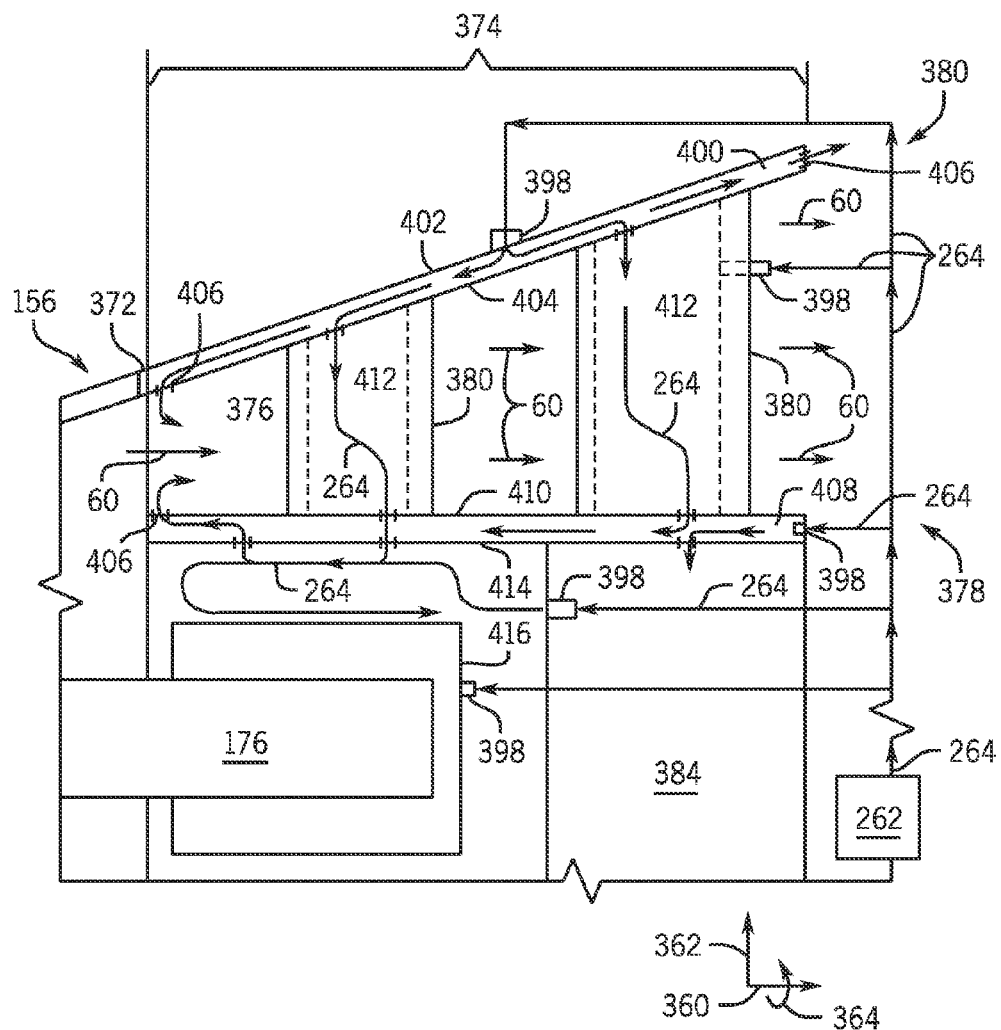
FIG. 7 is a cross-sectional view of a portion of a gas turbine engine coupled to a fluid supply system.

FIG. 7 is a cross-sectional view of the exhaust section 374. Elements in FIG. 7 in common with those shown in FIG. 6 are labeled with the same reference numerals. As shown in FIG. 7, the fluid supply system 262 supplies the inert gas 264 to various components of the exhaust section 374. For example, the inert gas 264 may be supplied to an outer shroud cavity 400 surrounding the exhaust passage 376. The outer shroud cavity 400 may be formed by a casing 402 extending circumferentially 364 (e.g., annular, rectangular, etc.) about an outer shroud 404, which in turn extends circumferentially 364 (e.g., annular, rectangular, etc.) about the exhaust passage 376. In certain embodiments, the casing 402 and the outer shroud 404 may be coaxial or concentric with one another. As shown in FIG. 7, a fluid inlet 398 may extend through the casing 402 to provide a path for the inert gas 264 to enter the outer shroud cavity 400 from the fluid supply system 262. Thus, the outer shroud cavity 400 may be used to cool, purge, or fluidly seal the portion of the exhaust section 374 adjacent the casing 402 and outer shroud 404. In other words, the outer shroud cavity 400 is an example of the inert gas passage 378, and the outer shroud 404 is an example of the wall 380 separating the exhaust passage 376 from the inert gas passage 378. In addition, the outer shroud cavity 400 may include a plurality of openings 406 (e.g., orifices) in the outer shroud 404 to enable the inert gas 264 to enter the exhaust passage 376. In other words, after the inert gas 264 flows through and cools, purges, and/or fluidly seals the outer shroud cavity 400, the inert gas 264 may combine with the exhaust gas 60 flowing through the exhaust section 374 via the plurality of openings 406.

In certain embodiments, the exhaust section 374 includes an inner shroud cavity 408 circumferentially 364 surrounded by the exhaust passage 376. Specifically, an inner shroud 410 (e.g., wall 380) may extend circumferentially 364 about the rotational axis 162 to define the inner shroud cavity 408. The exhaust passage 376 extends circumferentially 364 about the inner shroud 410, and the inert gas passage 378 extends through the inner shroud cavity 408. The inert gas 264 may be supplied directly to the inner shroud cavity 408 radially 362 and/or axially 360 (e.g., either along side or end of gas turbine) via one or more fluid inlets 398 or via the vanes 380, as described in detail below. After flowing through the inner shroud cavity 408, the inert gas 264 may flow through the plurality of openings 406 (e.g., orifices) formed in the inner shroud 410 to combine with the exhaust gas 60 in the exhaust passage 376. The inert gas 264 may be used to cool, purge, and/or fluidly seal the inner shroud cavity 408.

As shown in FIG. 7, one or more vanes 380 may protrude into the exhaust passage 376. For example, the vane 380 may extend between (and connect with both) the outer shroud 404 and the inner shroud 410. Each vane 380 may extend radially 362 through the exhaust passage 376. In addition, each vane 380 may include an internal vane cavity 412, and the inert gas passage 378 may extend through the internal vane cavity 412. For example, the inert gas 264 may be routed from the outer shroud cavity 400 through at least some of the plurality of openings 406 into the internal vane cavity 412 before entering the internal shroud cavity 408 through the plurality of openings 406 of the inner shroud 410. Thus, the vanes 380 may be used to convey the inert gas 264 from the outer shroud cavity 400 to the inner shroud cavity 408, and to provide cooling, purging, and/or fluid sealing of the vanes 380. In certain embodiments, the inert gas 264 may be provided directly to the vane 380 via one or more fluid inlets 398 along the exhaust passage 376.

In certain embodiments, the inner shroud 410 extends circumferentially 364 about a bearing housing 414. Thus, the inner shroud 410 and the bearing housing 414 may at least partially define the inner shroud cavity 408. In addition, a bearing assembly 416 may be disposed within the bearing cavity 384 of the bearing housing 414. Thus, the inner shroud cavity 408 may be said to include the space of the bearing housing 414, assembly 416, and so forth, because the inner shroud cavity 408 is mounted within the inner shroud 410. In other embodiments, the bearing assembly 416 may be at least partially disposed within the inner shroud cavity 408. The bearing assembly 416 may at least partially support the shaft 176 and may be disposed at various positions along the shaft 176. For example, the bearing assembly 416 may be disposed near the downstream end 372 of the turbine section 156, which may also be referred to as a #2 bearing location. As shown in FIG. 7, the inert gas 264 may enter the bearing cavity 384 radially 362 and/or axially 360 (e.g., either along side or end of gas turbine) via the fluid inlet 398. The inert gas 264 may circulate throughout the bearing housing 414 to help cool, purge, and/or fluidly seal the bearing assembly 416. In other embodiments, the inert gas 264 may enter the bearing assembly 416 directly via the fluid inlet 398. After cooling, purging, and/or fluidly sealing the bearing assembly 416, the inert gas 264 may exit the inner shroud cavity 408 via the plurality of openings 406 to mix with the exhaust gas 60 in the exhaust passage 376. The inert gas 264 may also be provided to the bearing housing 414 via the plurality of openings 406 in the bearing housing 414. Various lubricants and/or oils may be used in the bearing assembly 416. Such lubricants and oils may be subject to degradation upon exposure to oxygen, moisture, particulates, etc. Thus, by using the inert gas 264 for cooling, purging, and/or fluidly sealing the bearing assembly 416, the longevity of the lubricants and oils may be increased. Alternatively or additionally, less expensive lubricants and oils may be used for the bearing assembly 416 when the inert gas 264 is used for cooling. Although the previous discussion focused on use of the inert gas 264 with the exhaust section 374, in other embodiments, the inert gas 264 may be used with other sections of the gas turbine engine 150.

Figure 8:
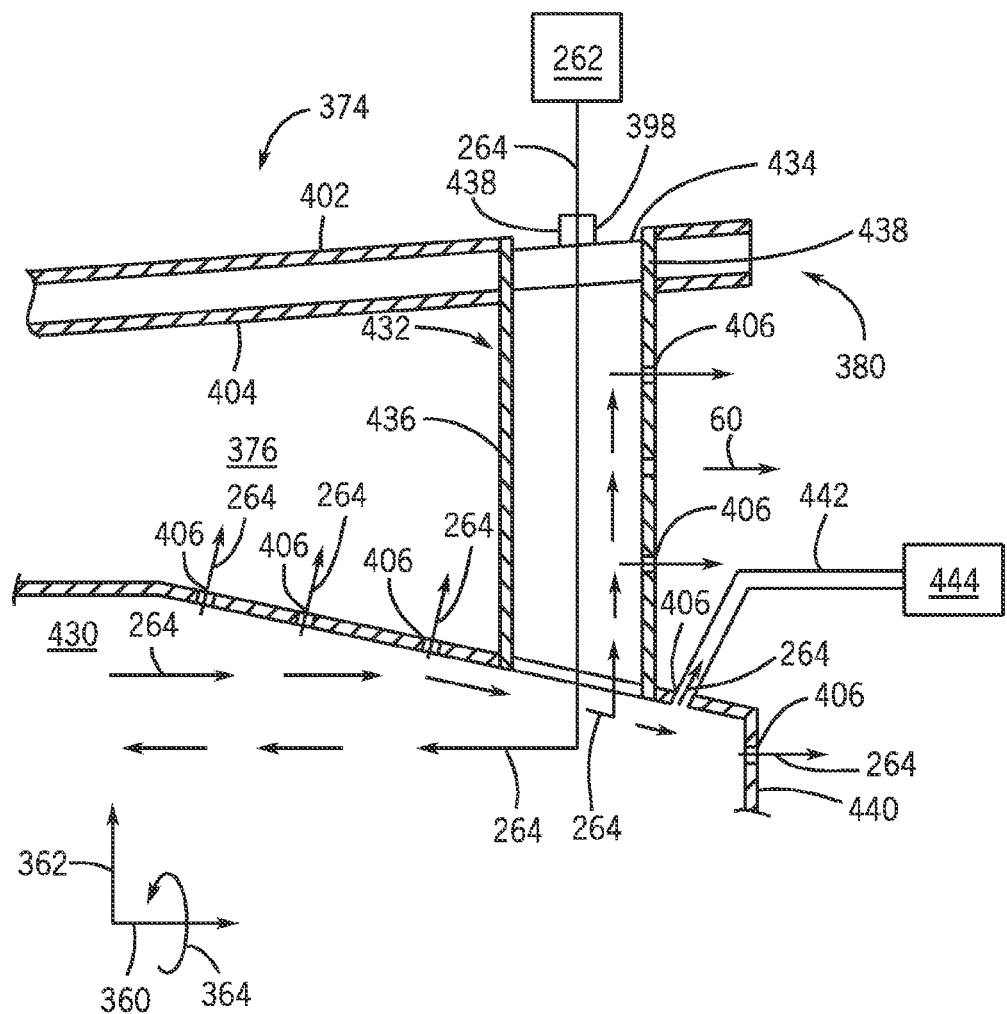
FIG. 8 is a cross-sectional view of a portion of an exhaust section of a gas turbine engine coupled to a fluid supply system.

FIG. 8 is a cross-sectional view of the exhaust section 374. Elements in FIG. 8 in common with those shown in FIG. 7 are labeled with the same reference numerals. As shown in FIG. 8, the fluid supply system 262 supplies the inert gas 264 to various components of the exhaust section 374. For example, the inert gas 264 may be supplied to an aft diffuser cavity 430 disposed downstream of the bearing cavity 384 with respect to the direction of flow of the exhaust gas 60 through the exhaust section 374. The casing 402 may extend circumferentially 364 about the outer shroud 404, which in turn extends circumferentially 364 about the aft diffuser cavity 430. In certain embodiments, the aft diffuser cavity 430 may be coupled to the bearing cavity 384. As shown in FIG. 8, the inert gas 264 may be supplied to the aft diffuser cavity 430 via a manway 432, which may be used to provide access to the aft diffuser cavity 430 from outside of the exhaust section 374. Specifically, the manway 432, which extends in the radial direction 362, may include an opening 434 formed in the casing 402 and outer shroud 404 coupled to a conduit 436 extending through the exhaust passage 376 from the outer shroud 404 to the aft diffuser cavity 430. The conduit 436 may have a circular, oval, or airfoil-shaped cross-section. The inert gas 264 may enter the manway 432 from the fluid supply system 262 via the fluid inlet 398 at the opening 434. In certain embodiments, a seal 438 may be used to block leakage to the atmosphere of inert gas 264 returning to the manway 432 after being used for cooling, purging, and/or diluting, thereby helping to contain the inert gas 264 and exhaust in the exhaust section 374. For example, the seal 438 may be disposed at the opening 434, the fluid inlet 398, or any combination thereof. The seal 438 may be made from an elastomeric material, plastic, fiber, metal, or any other material capable of blocking the inert gas 264. Use of the seal 438 may be desirable in certain embodiments in which the inert gas 264 includes gases that may be undesirable for human exposure, such as when the inert gas 264 includes exhaust gas 60. As personnel may be present adjacent to the exhaust section 374 during operation of the gas turbine engine 150, the seal 438 may be used to help block the inert gas 264 from reaching personnel working in the vicinity of the exhaust section 374.

In certain embodiments, the inert gas 264 flows through the manway 432 and into the aft diffuser cavity 430 to provide cooling, purging, and/or diluting of the aft diffuser cavity 430. The inert gas 264 supplied to the aft diffuser cavity 430 via the manway 432 may have a temperature lower than that of the exhaust gas 60. For example, the temperature control system 302 (e.g., the cooler 306) of the fluid supply system 262 may be used to cool exhaust gas 42 to produce the inert gas 264 (e.g., cooling gas 348). Thus, the inert gas 264 may be used to cool the portions of the exhaust section 374 through which the inert gas 264 flows. For example, a difference between the temperature of the exhaust gas 60 and the temperature of the inert gas 264 may be greater than approximately 100 degrees Celsius. In certain embodiments, the difference between the temperature of the exhaust gas 60 and the temperature of the inert gas 264 may be between approximately 20 to 400 degrees Celsius, 50 to 200 degrees Celsius, or 75 to 125 degrees Celsius. After being used for cooling, purging, and/or diluting in the aft diffuser cavity 430, the inert gas 264 may then exit the aft diffuser cavity 430 through one or more openings 406 to combine with the exhaust gas 60 flowing through the exhaust passage 376. For example, one or more openings 406 may be formed in a cap 440 of the aft diffuser cavity 430. A portion of the inert gas 264 may flow back into the manway 432 and then exit through one or more openings 406 formed in the conduit 436 to combine with the exhaust gas 60. In further embodiments, a vent 442 may be coupled to one or more of the openings 406 to route the inert gas 264 to an inert gas collection system 444. The vent 442 may be sealed or made from materials to help block exposure of personnel to the inert gas 264. In addition, the inert gas collection system 444 may be disposed away from personnel, thereby helping to avoid personnel exposure to the inert gas 264. The inert gas 264 collected by the inert gas collection system 444 may be reused for cooling, purging, and/or diluting after being routed back to the fluid supply system 262.

As described above, certain embodiments in the gas turbine engine 150 may include the turbine section 156 having one or more turbine stages 174 between the upstream end 370 and the downstream end 372, the exhaust section 374 disposed downstream from the downstream end 372, and the fluid supply system 262 coupled to the exhaust section 374. The fluid supply system 262 routes the inert gas 264 to the exhaust section 374. The inert gas 264 may then be used to provide cooling, purging, and/or fluidly sealing of various components of the exhaust section 374, such as the outer shroud cavity 400, the inner shroud cavity 408, the vane 380, the bearing cavity 384, the bearing assembly 416, or any combination thereof. After cooling, purging, and/or fluidly sealing the various components of the exhaust section 374, the inert gas 264 may combine with the exhaust gas 60 in the exhaust passage 376. The exhaust gas 60 may then be used for various applications, such as the oil/gas extraction system 16 or the enhanced oil recovery system 18 described above. In such applications, it may be desirable for the exhaust gas 60 to include little to no oxygen. Thus, use of the inert gas 264 for cooling, purging, and/or fluidly sealing of the exhaust section 374 may help to maintain the low oxygen content of the exhaust gas 60.

ADDITIONAL DESCRIPTION

The present embodiments provide systems and methods for gas turbine engines. It should be noted that any one or a combination of the features described above may be utilized in any suitable combination. Indeed, all permutations of such combinations are presently contemplated. By way of example, the following clauses are offered as further description of the present disclosure:

Embodiment 1

A system, comprising: a combustor section having one or more combustors configured to generate combustion products; a turbine section having one or more turbine stages between an upstream end and a downstream end, wherein the one or more turbine stages are driven by the combustion products; an exhaust section disposed downstream from the downstream end of the turbine section, wherein the exhaust section has an exhaust passage configured to receive the combustion products as an exhaust gas; and a fluid supply system coupled to the exhaust section, wherein the fluid supply system is configured to route a cooling gas to the exhaust section, wherein the cooling gas has a temperature lower than the exhaust gas, wherein the cooling gas comprises an extracted exhaust gas, a gas separated from the extracted exhaust gas, carbon dioxide, carbon monoxide, nitrogen oxides, or a combination thereof.

Embodiment 2

The system of embodiment 1, wherein the exhaust section comprises a cooling gas passage coupled to the fluid supply system, and the cooling gas passage extends through at least one wall along the exhaust passage.

Embodiment 3

The system defined in any preceding embodiment, wherein the cooling gas passage is isolated from the exhaust passage.

Embodiment 4

The system defined in any preceding embodiment, wherein the cooling gas passage is fluidly coupled to the exhaust passage.

Embodiment 5

The system defined in any preceding embodiment, wherein the exhaust section comprises a wall disposed along the exhaust passage, and the cooling gas passage is fluidly coupled to the exhaust passage through a plurality of openings in the wall.

Embodiment 6

The system defined in any preceding embodiment, wherein the cooling gas passage extends through at least one of an outer shroud cavity surrounding the exhaust passage, an inner shroud cavity surrounded by the exhaust passage, a vane protruding into the exhaust passage, a bearing cavity having a bearing assembly, or a combination thereof.

Embodiment 7

The system defined in any preceding embodiment, wherein the exhaust section comprises: an outer shroud extending circumferentially about the exhaust passage; and a casing extending circumferentially about the outer shroud to define an outer shroud cavity, wherein the cooling gas passage extends through the outer shroud cavity.

Embodiment 8

The system defined in any preceding embodiment, a vane protruding into the exhaust passage, wherein the vane comprises an internal vane cavity, and the cooling gas passage extends through the internal vane cavity.

Embodiment 9

The system defined in any preceding embodiment, an inner shroud extending circumferentially about a rotational axis of the gas turbine engine to define an inner shroud cavity, wherein the exhaust passage extends circumferentially about the inner shroud, and the cooling gas passage extends through the inner shroud cavity.

Embodiment 10

The system defined in any preceding embodiment, comprising a bearing assembly at least partially disposed within the inner shroud cavity.

Embodiment 11

The system defined in any preceding embodiment, wherein the gas turbine engine comprises a bearing assembly disposed within a bearing cavity of a bearing housing, and the fluid supply system is coupled to the bearing housing to route the cooling gas to the bearing housing.

Embodiment 12

The system defined in any preceding embodiment, wherein the cooling gas comprises the extracted exhaust gas or the carbon dioxide.

Embodiment 13

The system defined in any preceding embodiment, wherein the fluid supply system is coupled to an exhaust gas extraction system, an exhaust gas treatment system, an exhaust gas recirculation system, a carbon capture system, a gas separator, a gas purifier, a storage tank, a pipeline, or any combination thereof.

Embodiment 14

The system defined in any preceding embodiment, wherein the fluid supply system comprises a temperature control system, a pressure control system, a moisture removal system, a particulate removal system, or any combination thereof.

Embodiment 15

The system defined in any preceding embodiment, wherein the gas turbine engine comprises: a compressor section having an exhaust gas compressor driven by the turbine section, wherein the exhaust gas compressor is configured to compress and route the exhaust gas to the turbine combustor.

Embodiment 16

The system defined in any preceding embodiment, comprising an exhaust gas extraction system coupled to the gas turbine engine, and a hydrocarbon production system coupled to the exhaust gas extraction system.

Embodiment 17

The system defined in any preceding embodiment, wherein the gas turbine engine is a stoichiometric exhaust gas recirculation (SEGR) gas turbine engine.

Embodiment 18

The system defined in any preceding embodiment, wherein the exhaust section comprises a manway configured to provide access to an interior of the exhaust section, and wherein the manway comprises a seal configured to contain a flow of the cooling gas within the manway.

Embodiment 19

The system defined in any preceding embodiment, wherein the exhaust section comprises a vent configured to withdraw the cooling gas from the exhaust section.

Embodiment 20

The system defined in any preceding embodiment, wherein a difference between a temperature of the exhaust gas and the temperature of the cooling gas is greater than approximately 100 degrees Celsius.

Embodiment 21

The system defined in any preceding embodiment, wherein a difference between a temperature of the exhaust gas and the temperature of the cooling gas is between approximately 20 to 400 degrees Celsius.

Embodiment 22

A system, comprising: a turbine exhaust section configured to mount downstream from a turbine section of a gas turbine engine, wherein the turbine exhaust section comprises an exhaust passage configured to receive exhaust gas from the turbine section, and a cooling gas passage extending through a structure of the turbine exhaust section; and a fluid supply system coupled to the exhaust section, wherein the fluid supply system is configured to route a cooling gas to the cooling gas passage in the exhaust section, wherein the cooling gas has a temperature lower than the exhaust gas, wherein the cooling gas comprises an extracted exhaust gas, a gas separated from the extracted exhaust gas, carbon dioxide, carbon monoxide, nitrogen oxides, or a combination thereof.

Embodiment 23

The system defined in any preceding embodiment, comprising the gas turbine engine having the turbine exhaust section coupled to the turbine section.

Embodiment 24

The system defined in any preceding embodiment, wherein the gas turbine engine comprises: the turbine section having one or more turbine stages between an upstream end and a downstream end; a combustor section having a turbine combustor configured to generate combustion products to drive the one or more turbine stages in the turbine section; and a compressor section having an exhaust gas compressor driven by the turbine section, wherein the exhaust gas compressor is configured to compress and route the exhaust gas to the turbine combustor; wherein the turbine exhaust section is coupled to the gas turbine engine downstream from the downstream end of the turbine section.

Embodiment 25

The system defined in any preceding embodiment, wherein the gas turbine engine is a stoichiometric exhaust gas recirculation (SEGR) gas turbine engine.

Embodiment 26

The system defined in any preceding embodiment, wherein the cooling gas passage is isolated from the exhaust passage.

Embodiment 27

The system defined in any preceding embodiment, wherein the cooling gas passage is fluidly coupled to the exhaust passage.

Embodiment 28

The system defined in any preceding embodiment, wherein the exhaust section comprises a wall disposed along the exhaust passage, and the cooling gas passage is fluidly coupled to the exhaust passage through a plurality of openings in the wall.

Embodiment 29

The system defined in any preceding embodiment, wherein the cooling gas passage extends through at least one of an outer shroud cavity surrounding the exhaust passage, an inner shroud cavity surrounded by the exhaust passage, a vane protruding into the exhaust passage, a bearing cavity having a bearing assembly, or a combination thereof.

Embodiment 30

The system defined in any preceding embodiment, wherein the cooling gas comprises the extracted exhaust gas or the carbon dioxide.

Embodiment 31

The system defined in any preceding embodiment, wherein the fluid supply system is coupled to an exhaust gas extraction system, an exhaust gas treatment system, an exhaust gas recirculation system, a carbon capture system, a gas separator, a gas purifier, a storage tank, a pipeline, or any combination thereof.

Embodiment 32

The system defined in any preceding embodiment, wherein the fluid supply system comprises a temperature control system, a pressure control system, a moisture removal system, a particulate removal system, or any combination thereof.

Embodiment 33

The system defined in any preceding embodiment, wherein the turbine exhaust section comprises a manway configured to provide access to an interior of the turbine exhaust section, and wherein the manway comprises a seal configured to contain a flow of the cooling gas within the manway.

Embodiment 34

The system defined in any preceding embodiment, wherein the turbine exhaust section comprises a vent configured to withdraw the cooling gas from the turbine exhaust section.

Embodiment 35

The system defined in any preceding embodiment, wherein a difference between a temperature of the exhaust gas and the temperature of the cooling gas is greater than approximately 100 degrees Celsius.

Embodiment 36

The system defined in any preceding embodiment, wherein a difference between a temperature of the exhaust gas and the temperature of the cooling gas is between approximately 20 to 400 degrees Celsius.

Embodiment 37

A system, comprising: a turbine exhaust section configured to mount downstream from a turbine section of a gas turbine engine, wherein the turbine exhaust section comprises an exhaust passage configured to receive exhaust gas from the turbine section, and a cooling gas passage extending through a structure of the turbine exhaust section to route a cooling gas to the turbine exhaust section, wherein the cooling gas has a temperature lower than the exhaust gas, wherein the cooling gas comprises an extracted exhaust gas, a gas separated from the extracted exhaust gas, carbon dioxide, carbon monoxide, nitrogen oxides, or a combination thereof.

Embodiment 38

The system defined in any preceding embodiment, a fluid supply system coupled to the exhaust section, wherein the fluid supply system is configured to route the cooling gas to the cooling gas passage in the exhaust section.

Embodiment 39

The system defined in any preceding embodiment, comprising the gas turbine engine having the turbine exhaust section coupled to the turbine section.

Embodiment 40

The system defined in any preceding embodiment, wherein the cooling gas passage extends through at least one of an outer shroud cavity surrounding the exhaust passage, an inner shroud cavity surrounded by the exhaust passage, a vane protruding into the exhaust passage, a bearing cavity having a bearing assembly, or a combination thereof.

Embodiment 41

The system defined in any preceding embodiment, wherein the turbine exhaust section comprises a manway configured to provide access to an interior of the turbine exhaust section, and wherein the manway comprises a seal configured to contain a flow of the cooling gas within the manway.

Embodiment 42

The system defined in any preceding embodiment, wherein the turbine exhaust section comprises a vent configured to withdraw the cooling gas from the turbine exhaust section.

Embodiment 43

A method, comprising: combusting a fuel with an oxidant and an exhaust gas in a combustion portion of a turbine combustor to generate combustion products; driving a turbine with the combustion products from the turbine combustor; expanding and cooling the combustion products from the turbine through an exhaust passage in an exhaust section; and routing a cooling gas from a fluid supply system to the exhaust section, wherein the cooling gas comprises an extracted exhaust gas, a gas separated from the extracted exhaust gas, carbon dioxide, carbon monoxide, nitrogen oxides, or a combination thereof.

Embodiment 44

The method or system defined in any preceding embodiment, comprising routing the cooling gas from the fluid supply system to an outer shroud cavity of the exhaust section, wherein the outer shroud cavity is disposed between an outer shroud and a casing of the exhaust section, and the outer shroud extends circumferentially about the exhaust passage.

Embodiment 45

The method or system defined in any preceding embodiment, comprising routing the cooling gas from the fluid supply system to an internal vane cavity of a vane, wherein the vane extends into the exhaust passage of the exhaust section.

Embodiment 46

The method or system defined in any preceding embodiment, comprising routing the cooling gas from the fluid supply system to an inner shroud cavity of the exhaust section, wherein an inner shroud extends circumferentially about the inner shroud cavity, and the exhaust passage extends circumferentially about the inner shroud.

Embodiment 47

The method or system defined in any preceding embodiment, comprising routing the cooling gas through a bearing cavity of the exhaust section, wherein the bearing cavity comprises a bearing assembly.

Embodiment 48

The method or system defined in any preceding embodiment, wherein combusting comprises stoichiometrically combusting the fuel with the oxidant and the exhaust gas.

Embodiment 49

The method or system defined in any preceding embodiment, comprising extracting a portion of the exhaust gas, and routing the portion of exhaust gas to a hydrocarbon production system.

Embodiment 50

The method or system defined in any preceding embodiment, comprising sealing a flow of the cooling gas within a manway of the exhaust section.

Embodiment 51

The method or system defined in any preceding embodiment, comprising venting the cooling gas from the turbine exhaust section after circulating the cooling gas through at least one cavity.

Embodiment 52

The method or system defined in any preceding embodiment, wherein the gas turbine engine is configured to combust a mixture of a fuel and an oxidant with an equivalence ratio of approximately 0.95 to approximately 1.05.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a gas turbine engine, comprising:
    a combustor section having one or more combustors configured to generate combustion products;
    a turbine section having one or more turbine stages between an upstream end and a downstream end, wherein the one or more turbine stages are driven by the combustion products;
    an exhaust section disposed downstream from the downstream end of the turbine section, wherein the exhaust section comprises an exhaust passage configured to receive the combustion products as an exhaust gas, and a manway configured to provide access to an interior of the exhaust section, wherein the manway comprises one or more openings fluidly coupled to the exhaust passage; and
    a fluid supply system coupled to the exhaust section, wherein the fluid supply system is configured to process a cooling gas and to route the cooling gas to the exhaust section and through the manway to the interior of the exhaust section, wherein the cooling gas has a temperature lower than the exhaust gas, wherein at least a portion of the cooling gas is configured to exit the interior of the exhaust section into the exhaust passage through the one or more openings of the manway, wherein the cooling gas comprises an extracted exhaust gas, a gas separated from the extracted exhaust gas, carbon dioxide, carbon monoxide, nitrogen oxides, or a combination thereof, and the cooling gas comprises less than 10000 parts per million by volume (ppmv) of oxygen.

2. The system of claim 1, wherein the exhaust section comprises a cooling gas passage coupled to the fluid supply system, and the cooling gas passage extends through at least one wall along the exhaust passage.

3. The system of claim 2, wherein the cooling gas passage extends through at least one of an outer shroud cavity surrounding the exhaust passage, an inner shroud cavity surrounded by the exhaust passage, a vane protruding into the exhaust passage, a bearing cavity having a bearing assembly, or a combination thereof.

4. The system of claim 1, wherein the gas turbine engine comprises a bearing assembly disposed within a bearing cavity of a bearing housing, and the fluid supply system is coupled to the bearing housing to route the cooling gas to the bearing housing.

5. The system of claim 1, wherein the fluid supply system is coupled to an exhaust gas extraction system, an exhaust gas treatment system, an exhaust gas recirculation system, a carbon capture system, a gas separator, a gas purifier, a storage tank, a pipeline, or any combination thereof.

6. The system of claim 1, wherein the gas turbine engine comprises:
    a compressor section having an exhaust gas compressor driven by the turbine section, wherein the exhaust gas compressor is configured to compress and route the exhaust gas to the turbine combustor.

7. The system of claim 6, comprising an exhaust gas extraction system coupled to the gas turbine engine, and a hydrocarbon production system coupled to the exhaust gas extraction system.

8. The system of claim 6, wherein the gas turbine engine is a stoichiometric exhaust gas recirculation (SEGR) gas turbine engine.

9. A system, comprising:
    a turbine exhaust section configured to mount downstream from a turbine section of a gas turbine engine, wherein the turbine exhaust section comprises an exhaust passage configured to receive exhaust gas from the turbine section, a cooling gas passage extending through a structure of the turbine exhaust section, and a manway configured to provide access to an interior of the turbine exhaust section, wherein the manway extends through a casing of the turbine exhaust section and the cooling passage; and
    a fluid supply system coupled to the turbine exhaust section, wherein the fluid supply system is configured to process a cooling gas and to route the cooling gas to the cooling gas passage in the turbine exhaust section, wherein the cooling gas has a temperature lower than the exhaust gas, wherein the cooling gas comprises an extracted exhaust gas, a gas separated from the extracted exhaust gas, carbon dioxide, carbon monoxide, nitrogen oxides, or a combination thereof, and the cooling gas comprises less than 10000 parts per million by volume (ppmv) of oxygen.

10. The system of claim 9, wherein the cooling gas passage is isolated from the exhaust passage.

11. The system of claim 9, wherein the fluid supply system comprises a temperature control system, a pressure control system, a moisture removal system, a particulate removal system, or any combination thereof.

12. The system of claim 9, wherein the manway comprises a seal configured to contain a flow of the cooling gas within the manway.

13. The system of claim 9, wherein the turbine exhaust section comprises a vent coupled to the interior of the turbine exhaust section, wherein the vent is configured to withdraw the cooling gas from the interior of the turbine exhaust section.

14. A method, comprising:
    combusting a fuel with an oxidant and an exhaust gas in a combustion portion of a turbine combustor to generate combustion products;
    driving a turbine with the combustion products from the turbine combustor;

expanding and cooling the combustion products from the turbine through an exhaust passage in an exhaust section;

routing a cooling gas from a fluid supply system to the exhaust section, wherein the cooling gas comprises an extracted exhaust gas, a gas separated from the extracted exhaust gas, carbon dioxide, carbon monoxide, nitrogen oxides, or a combination thereof, and the cooling gas comprises less than 10000 parts per million by volume (ppmv) of oxygen;

routing the cooling gas from the fluid supply system to an inner shroud cavity of the exhaust section through a manway of the exhaust section; and routing the cooling gas from the inner shroud cavity to the exhaust passage through one or more openings of the manway.

15. The method of claim 14, comprising routing the cooling gas from the fluid supply system to an outer shroud cavity of the exhaust section, wherein the outer shroud cavity is disposed between an outer shroud and a casing of the exhaust section, and the outer shroud extends circumferentially about the exhaust passage.

16. The method of claim 14, comprising routing the cooling gas from the fluid supply system to an internal vane cavity of a vane, wherein the vane extends into the exhaust passage of the exhaust section.

17. The method of claim 14, wherein the inner shroud cavity of the exhaust section comprises an inner shroud that extends circumferentially about the inner shroud cavity, and the exhaust passage extends circumferentially about the inner shroud.

18. The method of claim 14, wherein the inner shroud cavity comprises a bearing cavity of the exhaust section, wherein the bearing cavity comprises a bearing assembly.

19. The method of claim 14, comprising sealing a flow of the cooling gas within the manway of the exhaust section.

20. The method of claim 14, comprising venting the cooling gas directly from the inner shroud cavity of the turbine exhaust section after circulating the cooling gas through the inner shroud cavity.

* * * * *